US006920695B2

(12) United States Patent
Zeiter et al.

(10) Patent No.: US 6,920,695 B2
(45) Date of Patent: Jul. 26, 2005

(54) HAND-HELD SABER SAW

(75) Inventors: Olivier Zeiter, Agarn (CH); Daniel Saegesser, Langenthal (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/467,155

(22) PCT Filed: Jan. 31, 2003

(86) PCT No.: PCT/DE03/00275

§ 371 (c)(1),
(2), (4) Date: Aug. 4, 2003

(87) PCT Pub. No.: WO03/074219

PCT Pub. Date: Sep. 12, 2003

(65) Prior Publication Data

US 2004/0055167 A1 Mar. 25, 2004

(30) Foreign Application Priority Data

Mar. 1, 2002 (DE) .......................................... 102 08 867

(51) Int. Cl.⁷ .............................................. B23D 49/16
(52) U.S. Cl. .......................... 30/392; 30/500; 30/DIG. 1
(58) Field of Search ..................... 30/392–394, DIG. 1, 30/500, 122; 74/50

(56) References Cited

U.S. PATENT DOCUMENTS

| 2,695,522 | A | 11/1954 | Papworth |
| 5,020,606 | A | 6/1991 | Odor |
| 5,755,293 | A | 5/1998 | Bourke |
| 6,256,891 | B1 | 7/2001 | Van Camp |

FOREIGN PATENT DOCUMENTS

| DE | 199 25 750 A | 12/2000 |
| GB | 1 377 552 A | 12/1974 |

*Primary Examiner*—Douglas D Watts
(74) *Attorney, Agent, or Firm*—Michael J. Striker

(57) ABSTRACT

A reciprocating hand saw (10), having a motor housing (16) and a gearbox (28) that receive a battery-operated direct-current motor (18) with a motor shaft having a shaft end (22) and a gear (28), respectively, which gear—as known per se in reciprocating saws—is connected to the shaft end in a way driven to rotate and whose gear input pinion (26) converts the rotation of the motor shaft end (22) into an up-and-down motion of a push rod (34) that carries a sawblade (38), can be produced economically and is especially sturdy because the gear (28) and its gearbox (14) originate in a reciprocating saw that can be operated by alternating current, and because between the shaft end (22) and the gear input pinion (26), a multi-stage coupling (24), disposed in a manner fixed against relative rotation for transmitting torque, comprises parts that can be easily separated from one another.

10 Claims, 4 Drawing Sheets

HAND-HELD SABER SAW

BACKGROUND OF THE INVENTION

The invention is based on a reciprocating hand saw with a direct-current motor.

A reciprocating hand saw with a direct-current motor is already known in which the gearbox and the gear of a conventional reciprocating hand saw, which can be operated with alternating current, is coupled to a direct-current motor, and the gear input pinion is coupled in a manner fixed against relative rotation to the motor shaft of the direct-current motor via a one-piece coupling part. This coupling is relatively inelastic and is therefore vulnerable to a deviation in parallelism of the motor axis to the gear axis. Because of the requisite high alignment accuracy required, the known battery-operated reciprocating hand saw is relatively inexpensive and vulnerable to shock or impact, or in other words to an unwanted change in position of the motor.

SUMMARY OF THE INVENTION

The reciprocating hand saw of the invention with a direct-current motor, has the advantage that the direct-current motor can be disposed relative to the gear or the gear input pinion with especially great tolerances, and is invulnerable to shock or impact.

Because a motor housing for the direct-current motor can be mounted on a standard reciprocating saw housing for connection to an electrical outlet, the development cost for creating a special gear and gearbox for direct-current operation are omitted.

Because the motor housing, especially on its end, has a detachable, interchangeable battery pack, an economical power reciprocating saw is created that can be operated independently of an electrical outlet.

Because the coupling pinion to be spanned can be coupled quasi-universally to the shaft end of the motor, the reciprocating hand saw will function even if the direct-current motor is in a severely skewed position compared to the gear input pinion.

Because the coupling pinion is designed as an elastic plastic part, and in particular as a radially deformable sleeve, it acts to damp shock and noise in the transmission of force between the direct-current motor and the gear input pinion.

Because a joint is quasi-formed between the coupling part and the coupling pinion, high torques and rotary speeds can be transmitted without problems even if the motor is at angular positions to the gear.

BRIEF DESCRIPTION OF THE DRAWINGS

The invention is described below in terms of an exemplary embodiment in conjunction with the drawing.

Shown are.

DESCRIPTION OF THE PREFERRED EMBODIMENTS

Figure 1:
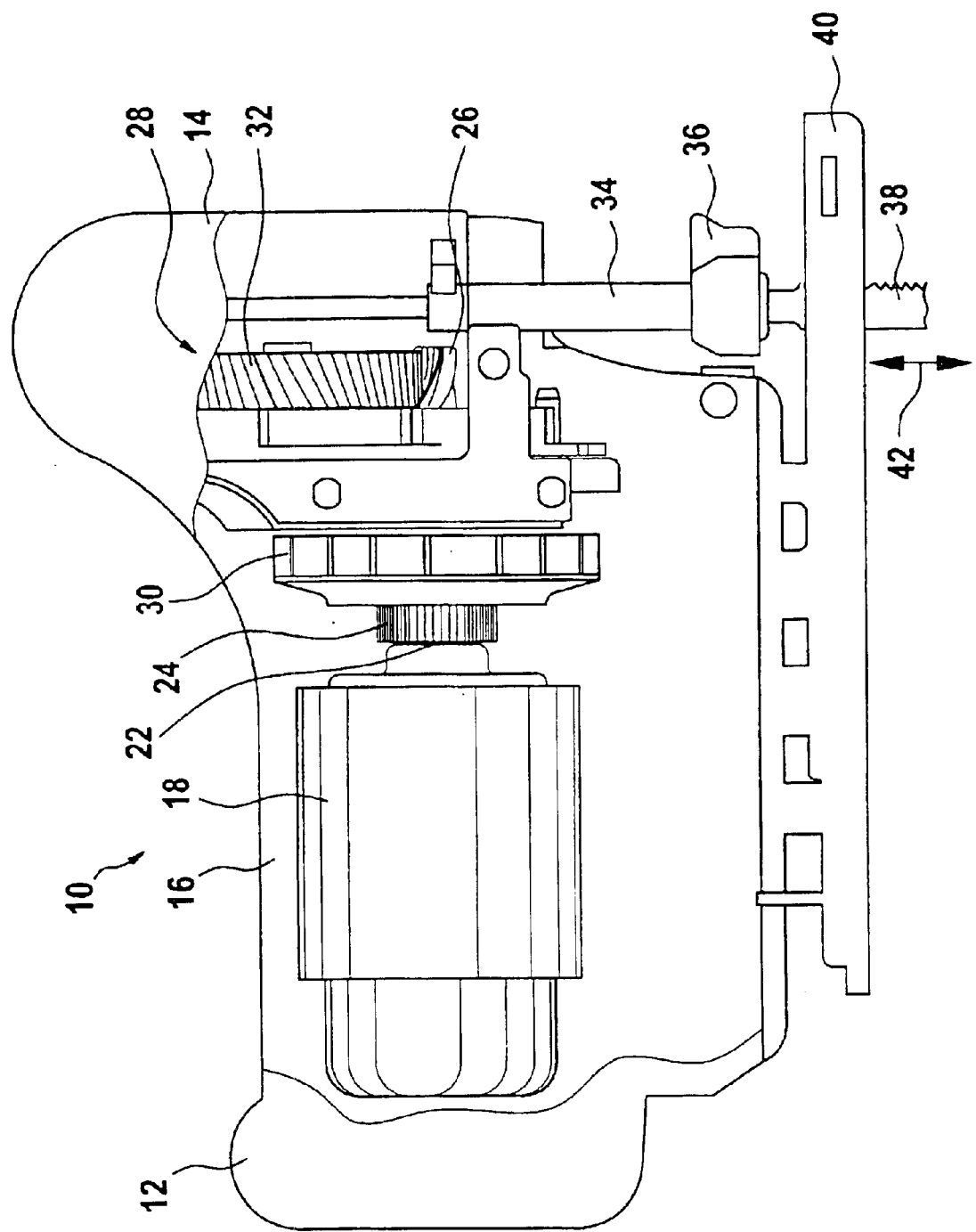
FIG. 1, a longitudinal section through a reciprocating saw of the invention.

The power tool shown in FIG. 1 is designed a reciprocating hand saw 10, which can be supplied with energy via a battery pack 12 or direct current. It comprises a gearbox 14, to which a motor housing 16 is flanged. The motor housing 16, on its end, has a battery pack 12, and closely adjacent to the battery pack, a direct-current motor 18, mounted with vibration damping, whose motor shaft is coupled on the shaft end 22, via a multi-part coupling 24, to a gear input pinion 26 of a conventional reciprocating saw gear 28.

The coupling 24 has a fan 30, which serves to cool the motor or create blowing air to blow away chips that collects on the surface of workpieces as they are being sawed and make it more difficult to control the sawing process.

The reciprocating saw gear 28 comprises a large power takeoff pinion 32, whose rotary motion is converted, by a sliding block gear, not shown, into an up-and-down motion of a push rod 34 pointing downward out of the gearbox 14. The push rod 34, on its lower, free end, has a chucking device 36 with which a reciprocating saw blade can be firmly restrained on the push rod 34 with a strong holding force.

The reciprocating saw blade 38 protrudes downward through a foot plate 40 and is moved up and down during sawing as indicated by the motion arrow 42. Upon actuation of the ON switch, not shown, the rotary motion of the motor is transmitted via the coupling 24 to the gear input pinion 26 and brings about the saw blade motion, which is elastically damped by the coupling 24.

Figure 2:
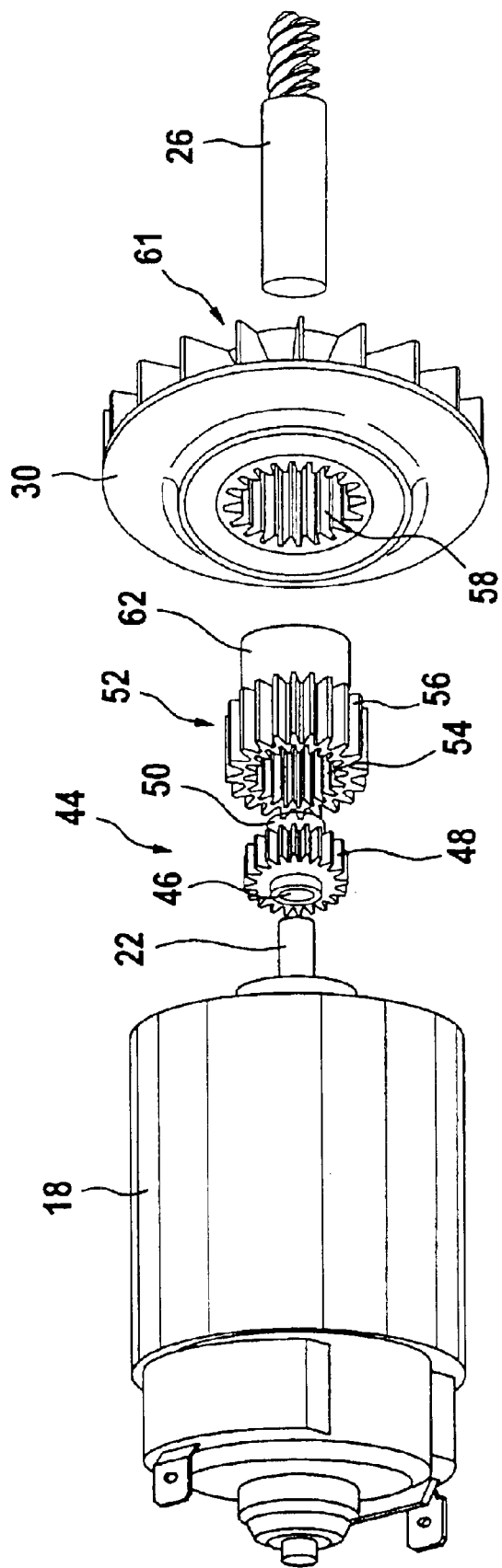
FIG. 2, an exploded view of the motor with the coupling and the gear of the reciprocating saw of the invention.

FIG. 2 shows the exploded view of the direct-current motor 18 and the shaft end 22, which protrudes to the right from the encapsulated motor 18. A toothed-shaftlike coupling part 44 is associated with the shaft end 22. This part has a central bore 46, which can be pressed onto the shaft end 22 and grips it by nonpositive engagement in a manner fixed against relative rotation. The coupling part 44 has an external toothing 48, which is embodied as a standard set of teeth with a flank angle of 30°. The coupling part 44, on its face end remote from the motor 18, also has an axially protruding, smooth centering collar 50. On the right in the viewing direction, next to the coupling part 44, there is a coupling pinion 52, whose internal toothing 54 in the form of a hollow wheel or toothed hub engages the external toothing 48 of the coupling part 44 with minimal play, for slaved rotation.

The coupling pinion 52 is designed on the inside and outside as a stepped cylinder and on its outside, in its larger diameter region, it has an external toothing 56 for positive engagement with an internal toothing 58, in the form of a hollow wheel, of the fan 30. These sets of teeth are embodied as standard sets of teeth with a flank angle of 30°.

The internal toothing 58 of the fan 30 merges in stepped fashion with a smaller bore, not shown, which by nonpositive engagement grips a smooth centering piece 62 of the coupling pinion 52 and thus centers the fan 30 relative to the coupling pinion 52.

The internal toothing 54 of the coupling pinion 52 also merges with a smaller bore, not shown, into which the rear, smooth-cylindrical end of the gear input pinion 26 can be press-fitted by nonpositive engagement.

If the coupling pinion 52 together with the fan 30 is brought fully into engagement with the coupling part 44, seated on the shaft end 22 in a manner fixed against relative rotation, then high torque can be exerted on the gear input pinion 26, which is seated centrally and in a manner fixed against relative rotation in the region of the coupling pinion 52 remote from the motor. Since the coupling part 44 and the coupling pinion 52 are of plastic and are particularly elastic, relatively high angular tolerances can be accepted between the motor axis 18 and the axis of the gear input pinion 26 in the production and installation of the motor housing or motor 18.

The fan 30 has a central stepped bore 61, whose larger diameter can be brought into engagement nonpositively with the coupling pinion 52, and whose smaller, smooth diameter, to provide centering when the fan is pressed onto the coupling pinion 52, fits by nonpositive engagement over the smooth centering piece 62 of the coupling pinion 52. In the intended position after the fan 60 has been mounted on the coupling pinion 52, the coupling pinion 52 protrudes with its external toothing 56 to the left, in the viewing direction, out of the fan 60.

Figure 3:
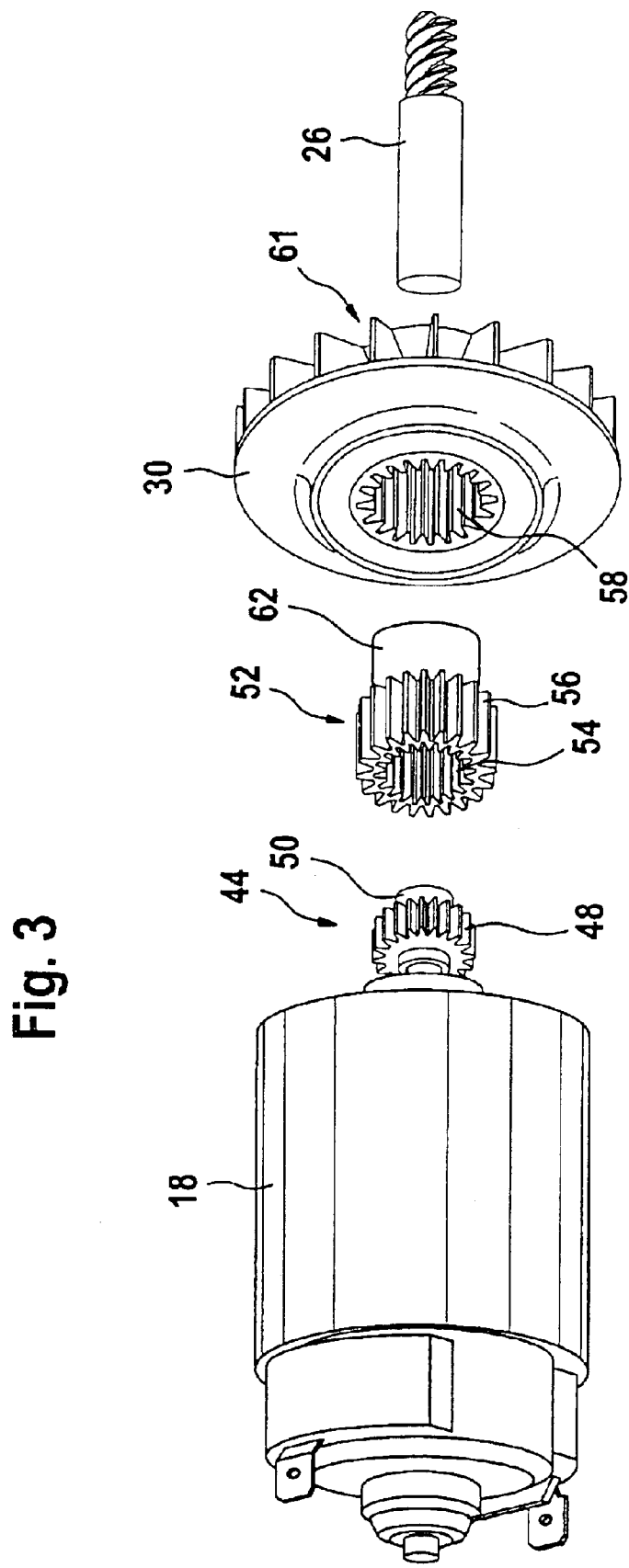
FIG. 3, an exploded view of FIG. 2 with the coupling part installed.
Figure 4:
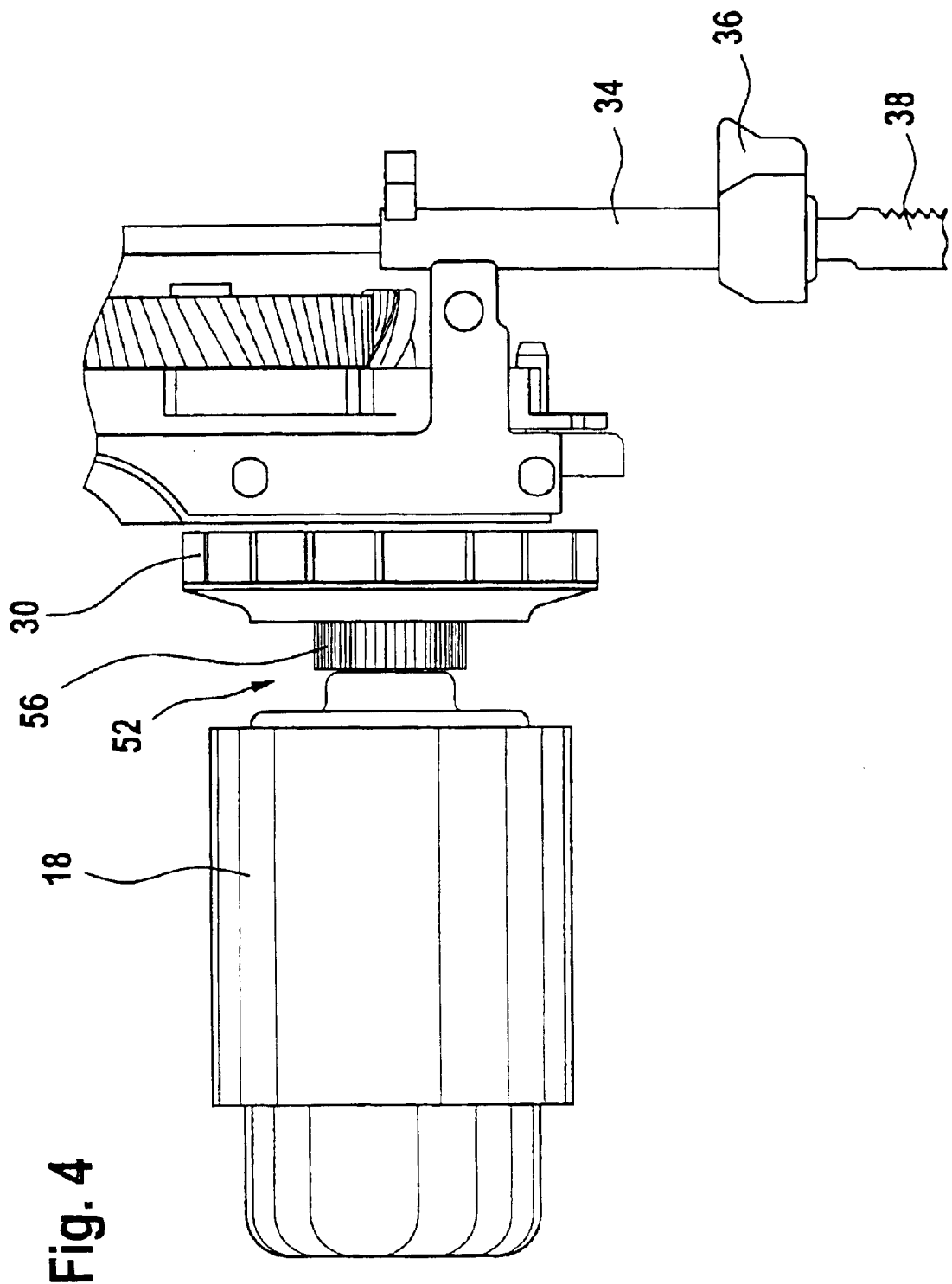
FIG. 4, a longitudinal section of FIG. 1 without the housing.

FIGS. 3 and 4 show the details of the drawings described above in similar views and serve to illustrate the invention clearly without having to repeat the details.

What is claimed is:

1. A reciprocating hand saw (10), having a motor housing (16) and a gearbox (28) that receive a battery-operated direct-current motor (18) with a motor shaft having a shaft end (22) and a gear (28), respectively, which gear—as known per se in reciprocating saws—is connected to the shaft end in a way driven to rotate and whose gear input pinion (26) converts the rotation of the motor shaft end (22) into an up-and-down motion of a push rod (34) that carries a sawblade (38), wherein the gear (28) and its gearbox (14) originate in a reciprocating saw that can be operated by alternating current; and between the shaft end (22) and the gear input pinion (26), a multi-stage coupling (24), disposed in a manner fixed against relative rotation for transmitting torque, comprises parts easily separated from one another and in particular axially insertable into one another, and wherein one part of the coupling (24) has a fan (30).

2. The reciprocating hand saw of claim 1, wherein the sleevelike coupling pinion (52) is designed on the outside as a stepped cylinder, which in its larger diameter region has an external toothing (56) and in its smaller diameter region forms a smooth centering piece (62), and the fan (30), with a fitting stepped bore, is associated with this stepped cylinder.

3. The reciprocating hand saw of claim 2, wherein the stepped bore of the fan (30) comprises a larger bore with an internal toothing (58) and a smooth, smaller bore, which is associated with the external toothing (56) and the smooth centering piece (62) of the coupling pinion (52).

4. The reciprocating hand saw of claim 3, wherein the external toothing (48) of the coupling part (44) and the internal toothing (54) of the coupling pinion (52) are standard sets of teeth with a flank angle of 30°.

5. The reciprocating hand saw of claim 1, wherein a battery pack (12) is disposed interchangeably, in particular removably and in captive fashion on the back of the motor housing (16).

6. The reciprocating hand saw of claim 1, wherein the coupling pinion (52) is an elastic plastic part, and by adaptation of its individual tolerances, errors of alignment between the motor (18) and gear (28) can be compensated for.

7. The reciprocating hand saw of claim 1, wherein the external toothing (56) of the coupling pinion (52) and the internal toothing (58) of the fan (30) are standard sets of teeth with a flank angle of 30°.

8. The reciprocating hand saw of claim 1, wherein the motor (18) is mounted elastically in the motor housing (16).

9. A reciprocating hand saw (10), having a motor housing (16) and a gearbox (28) that receive a battery-operated direct-current motor (18) with a motor shaft having a shaft end (22) and a gear (28), respectively, which gear—as known perse in reciprocating saws—is connected to the shaft end in a way driven to rotate and whose gear input pinion (26) converts the rotation of the motor shaft end (22) into an up-and-down motion of a push rod (34) that carries a sawblade (38), wherein the gear (28) and its gearbox (14) originate in a reciprocating saw that can be operated by alternating current; and that between the shaft end (22) and the gear input pinion (26), a multi-stage coupling (24), disposed in a manner fixed against relative rotation for transmitting torque, comprises parts easily separated from one another and in particular axially insertable into one another, and wherein the coupling (24) has a toothed-shaftlike coupling part (44), which on its face end toward the motor can be coupled to the shaft end (22) of the motor shaft in a manner fixed against relative rotation and which together with a coupling pinion (52) forms a toothed shaft/toothed hub connection which can be centered via a centering collar (50) of the coupling part (44) by its engagement with a corresponding counterpart bore of the coupling pinion can be connected to the gear input pinion (26) in a manner fixed against relative rotation.

10. A reciprocating hand saw (10), having a motor housing (16) and a gearbox (28) that receive a battery-operated direct-current motor (18) with a motor shaft having a shaft end (22) and a gear (28), respectively, which gear—as known per se in reciprocating saws—is connected to the shaft end in a way driven to rotate and whose gear input pinion (26) converts the rotation of the motor shaft end (22) into an up-and-down motion of a push rod (34) that carries a sawblade (38), wherein the gear (28) and its gearbox (14) originate in a reciprocating saw that can be operated by alternating current; and between the shaft end (22) and the gear input pinion (26), a multi-stage coupling (24), disposed in a manner fixed against relative rotation for transmitting torque, comprises parts easily separated from one another and in particular axially insertable into one another, and wherein the multi-stage coupling consist of at least three parts (44, 52, 30), in particular being axially insertable onto one another and easily separatable from one another.

* * * * *